INVENTORS
ROBERT B. HANSEN,
HENRY CARL WALDSCHMIDT
BY
Mueller, Aichele & Rauner
ATTYS.

INVENTORS
ROBERT B. HANSEN,
HENRY CARL WALDSCHMIDT
BY
Mueller, Aichele & Rauner
ATTYS.

3,441,664
COLOR TELEVISION RECEIVER

Robert B. Hansen, Arlington Heights, and Henry C. Waldschmidt, Matteson, Ill., assignors to Motorola, Inc., Franklin Park, Ill., a corporation of Illinois Filed Feb. 9, 1966, Ser. No. 526,177
Int. Cl. H04n 5/38, 5/44
U.S. Cl. 178—5.4 4 Claims

ABSTRACT OF THE DISCLOSURE

In a demodulator system for a color television signal the operating point of a tube is selected so that the amplification of signals applied thereto is non-linear. By properly selecting the operating point there is less amplitude of translated signal for a given variation of an applied signal from a reference level in one direction than the amplitude of the translated signal for an equal variation of the applied signal from the reference level in the other direction. By this means the proportions of color signals applied to the cathode ray tube are selectively distorted to improve the color picture.

Figure 1:
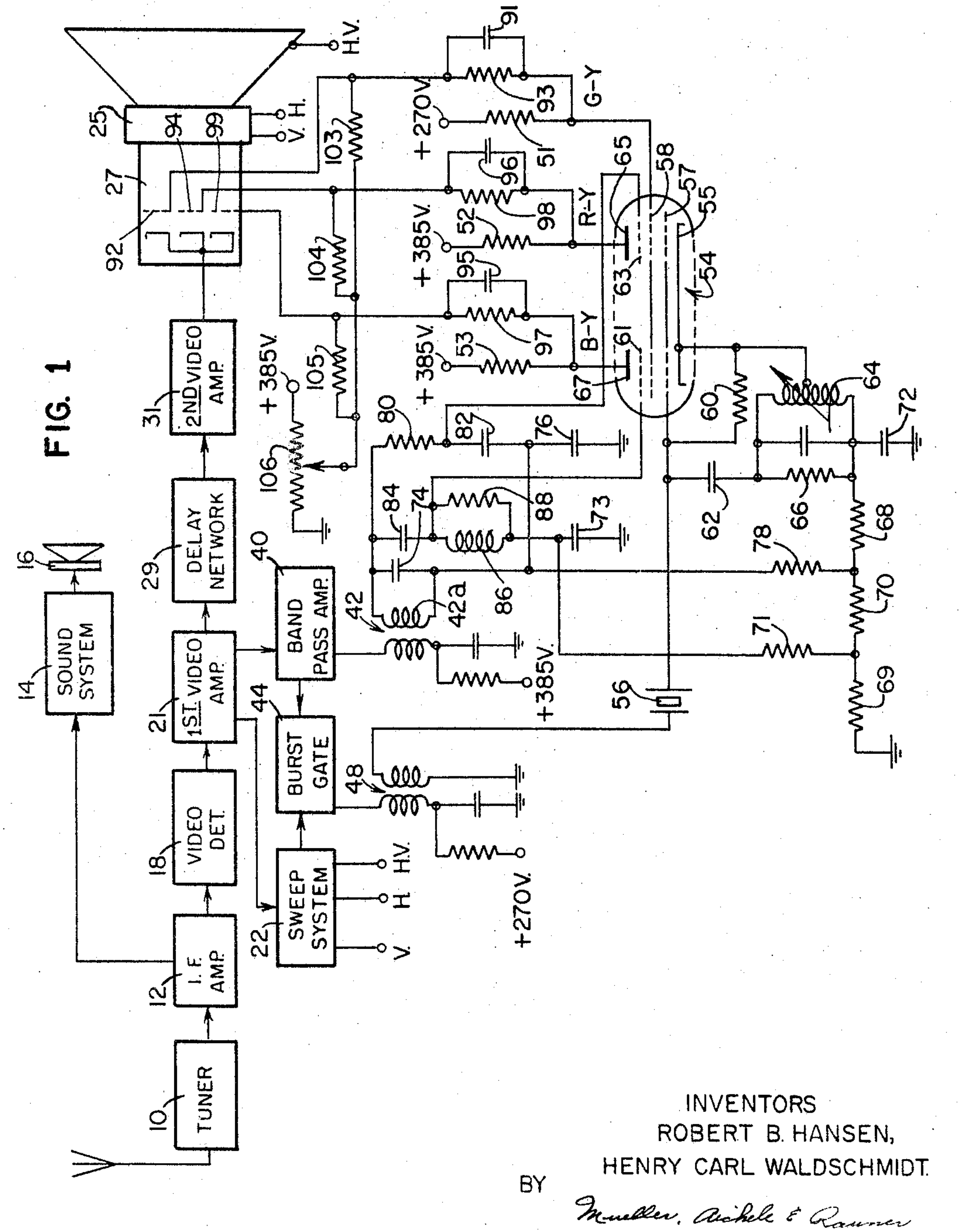

The usual color television receiver responds to a composite program signal having a carrier which is amplitude modulated by brightness or luminance components, as well as by horizontal and vertical synchronizing pulses for properly timing the scanning of the reproduced image. This composite signal also includes chroma information in the form of amplitude and phase modulation of a suppressed subcarrier. A reference for the demodulation of the chroma signal is provided by a few cycles of a color reference burst signal transmitted along with each horizontal synchronizing pulse so that a reference oscillator in the receiver can be phase controlled with the transmitter color reference. Color information is demodulated at different phase angles with respect to the color reference signal and these demodulated signals represent three primary color difference signals ($R-Y$, $B-Y$, $G-Y$) which are utilized, together with a luminance signal (Y), to energize a cathode ray tube for producing an image with proper brightness, color hue, and color saturation.

It has been found possible to combine in one electron amplifier tube the functions of generating a color reference signal which is phase locked to the reference burst signal and detecting directly three color difference signals with respect to the reference. Such a combined oscillator and demodulator comprises a vacuum tube with a common cathode and control grid acting as a locked oscillator, and with a pair of demodulator grids in the tube responding to phase differing chroma signals to produce the red and blue color difference signals at respective anodes associated with such grids. A common screen grid in the tube provides green color difference signals directly, as a phase reversed combination of the red and blue color difference signals at the anodes of the tube.

The described combination oscillator and demodulator, and even other types of demodulating systems as well, may develop signals in which certain colors, such as red, yellow, green, and flesh tones, contain an undesirable amount of blue, as viewed on the cathode ray tube screen. Therefore, a divider network in the blue section of the color demodulator is often used to obtain a reduced amplitude of $B-Y$ signal information with respect to $R-Y$ signal information. Such a divider network provides an equal amount of positive and negative signal swing. But it should be noted that a given substantial negative swing of the $B-Y$ signal could improve all colors which need no blue to be reproduced, but an associated equivalent positive swing could make colors inaccurate which need only a certain amount of blue to be reproduced.

The same problem occurs for an equal increase of the positive and negative swing of the $G-Y$ signal by a divider network.

It is an object of this invention to improve a color demodulation system to obtain more pleasing red, yellow, green and flesh tones.

Another object is to simplify and reduce the cost of a color signal demodulation system by eliminating parts.

Still another object is to provide the effect of more direct current (DC) coupling for the $B-Y$ and $G-Y$ information without the disadvantage of more actual DC coupling.

A feature of the invention is the provision of a larger bias at a blue signal demodulator than at a red signal demodulator so that the amplitude of the blue signal is compressed in respect to the red signal during reproduction of certain colors.

Another feature is the provision of non-linear biasing for the green and blue signal demodulators as compared with the biasing of the red signal demodulator.

In a specific form of the demodulator system of the invention a common cathode and control grid of a two section vacuum tube are connected in an oscillator circuit operative at the frequency of the color reference signal. The vacuum tube further includes separate demodulator grids to which are applied the chroma modulation information by way of separate phase shift networks and a coupling transformer connected to a bandpass amplifier. The chroma signal on each of the demodulator grids is properly shifted in phase to provide $R-Y$ and $B-Y$ signals at respective anodes associated with each of the grids. A common screen grid in the tube provides $G-Y$ information. The oscillator circuit comprises a tuned circuit including a capacitor and a variable inductor. A tap of the inductor is connected to the common cathode of the two section tube. A series resistor having two taps is connected from the bottom of the tuned circuit to ground. One of those taps is DC coupled to the $B-Y$ demodulator grid and the other tap to the $R-Y$ demodulator grid so that the bias of the $B-Y$ grid is larger than that of the $R-Y$ grid to provide at the $B-Y$ anode, as well as at the $G-Y$ screen grid, a greater negative swing than positive swing of the voltage of the color representing signal, due to operation in a non-linear manner.

In further practicing the invention a color television receiver comprises a cathode ray image reproducer and a system for translating signals representing red and blue color signals for driving the cathode ray image reproducer. The color signals vary in opposite directions from a reference level to respectively represent increased and decreased production of the color represented thereby. Translating means are provided for translating the red signal to the cathode ray image reproducer with substantially linear variation from the reference level. The translating means further translates the blue color signal to the cathode ray image reproducer with a lesser amplitude for variations thereof from the reference level which represent increased production of the blue color represented thereby than for variations thereof which represent decreased production of the blue color represented thereby. For translating a green color signal translating means can be used which translate the green color signal to the cathode ray image reproducer in the same way as the blue color signal is translated.

Figure 2:
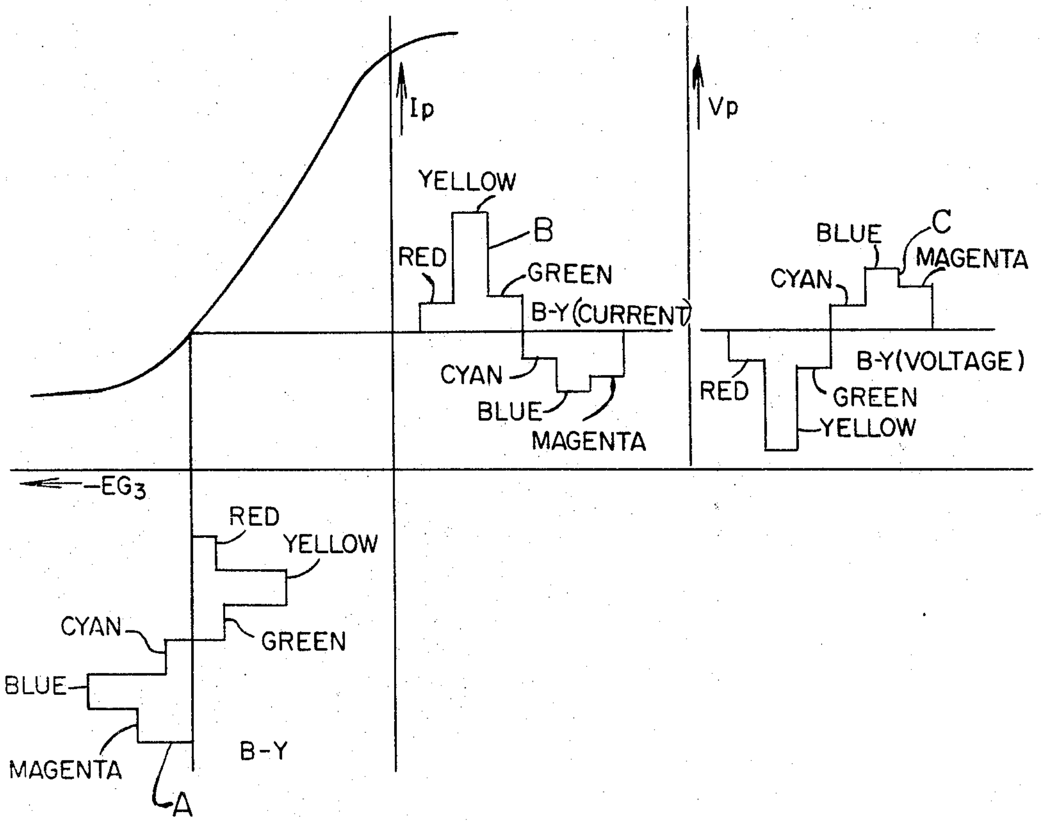

The invention is illustrated in the drawings, wherein:

FIG. 1 shows the diagram, partly in block and partly schematic, of a color television receiver incorporating the demodulator system according to the invention; and FIG. 2 shows the suppressor grid voltage to plate current transfer electrostatic of the demodulation tube for amplification of the demodulated color signals of a color-bar-signal.

The color television receiver illustrated in FIG. 1 comprises a tuner 10 which selects a television signal and converts it to one of intermediate frequency to be further amplified in the IF amplifier 12. A sound subcarrier of the signal is selected by the sound system 14 to be demodulated and amplified for operating the loudspeaker 16.

The video detector 18 is connected to the IF amplifier 12 for demodulating video portions of the received composite program signal to produce luminance signal components, synchronizing signal components, color reference burst signals and modulation information representing the chroma signal. These signal components are applied to the first video amplifier 21. Vertical and horizontal synchronizing components are coupled to the sweep and high voltage system 22 which provides high voltage and sawtooth sweep signals at the vertical and horizontal deflection frequencies (60 cps. and 15.75 kc., respectively) for energizing the magnetic deflection yoke 25 on the neck of the tri-beam cathode ray picture tube 27.

Luminance components of the demodulated signal are coupled through the delay network 29 from the video amplifier 21 to the further video amplifier 31. The network 29 is included to delay the luminance information so that it will coincide with the chroma information as the signals of both types are applied to the tube 27. The luminance signal is coupled from the video amplifier 31 to the interconnected cathodes of the three electron guns in the color picture tube 27.

The bandpass, or color IF, amplifier 40 serves to amplify the chroma modulation information in the form of modulation of a 3.58 megacycle suppressed color subcarrier. The amplified and selected chroma modulation components are developed in the coupling transformer 42. Amplifier 40 is also connected to the burst gate circuit 44. A gating signal at the horizontal deflection frequency is applied to the gate circuit 44 from the sweep system 22 so that the gate 44 will be responsive during the reference burst signal with each horizontal synchronizing pulse in the received signal. Accordingly, in the transformer 48 there appears a reference signal which has the frequency and phase of the color reference burst in the received television signal.

The color demodulator system includes a vacuum tube 54 which is a dual pentode with the cathode 55, the control grid 57, and the screen grid 58 being common to both sections of the tube, whereas the blue demodulator section comprises suppressor-grid 61 and plate 67 and the red demodulator section comprises suppressor-grid 63 and plate 65. The system performs the function of demodulating the red and blue color difference signals, amplifying these color difference signals, oscillating at the frequency of the color subcarrier, and directly demodulating the green color difference signal. The system is therefore a self-oscillating, dual pentode, injection locked demodulator.

The cathode, control grid and screen grid of tube 54 are connected as an oscillator which is locked in phase by the 3.58 megacycles color reference signal applied thereto from transformer 48. A crystal 56 is connected between the secondary winding of transformer 48 and the control grid of tube 54 to act as a crystal filter for the incoming synchronizing signals. Since this crystal is the highest Q tank circuit in the oscillator, it will ring at relatively high amplitude at a frequency of approximately 3.58 megacycles to cause the free-running oscillator portion of the demodulator to follow in phase with the input burst reference signal.

A grid leak resistor 60 is connected between the control grid 57 and the cathode 55 of the tube 54, while a feedback coupling capacitor 62 is connected from the control grid 57 to the top of a tuned circuit 64. This resonant circuit 64 includes a capacitor and variable inductor tuned to the reference frequency 3.58 megacycles. A tap of the inductor is connected to the cathode of the tube 54. A damping resistor 66 is connected across the tuned circuit 64. A series connected combination of resistor 68, resistor 70 and resistor 69 is connected from the bottom of the tuned circuit 64 to ground. These resistors 68, 70, 69 are provided to produce a certain direct current bias voltage and they are bypassed by means of the capacitor 72. The resistor-capacitor network 68, 70, 69, 72 is further selected in value to provide degeneration of low frequency signal energy to prevent noise streaking during monochrome signal reception when spurious signals might be introduced into the oscillator portion of the demodulator through the burst gate 44 and the crystal 56.

The screen grid 58 of the tube 54 effectively forms the anode for the oscillator section of the multi-function tube. This grid is connected to a positive potential source through resistor 51.

The coupling transformer 42 furnishes the chrominance information for the demodulator tube 54. The secondary winding **42*a* of transformer 42 is shunted by a capacitor 74 and is tuned substantially to 3.58 megacycles. The bottom terminal of the secondary winding 42*a* is bypassed to ground through a large capacitor 76. A resistor 78 is connected from the bottom terminal to the junction of resistor 68 and 70 in the cathode circuit of tube 54. Resistor 78 is in a direct current path from the bottom of the cathode bias resistor 68 through winding 42*a* and resistor 80 to the third or suppressor grid 63 of the $R-Y$ demodulator section in orderto properly DC reference the $R-Y$ color demodulator grid 63 of the tube 54. The bias of the $R-Y$ suppressor grid 63 has a value which provides a generally linear amplification of the demodulated $R-Y$ signal. A capacitor 82 is also connected from this grid to the bottom side of the secondary winding 42*a*. The network 80, 82 forms a phase shift delay network for the chroma signal so that the signal appearing on the $R-Y$ suppressor grid 63** is delayed by 44°.

The blue or $B-Y$ suppressor grid 61 of the tube 54 is connected to the top side of the secondary winding **42*a* through a capacitor 84. This blue demodulator grid 61 is coupled through the parallel combination of inductor 86 and resistor 88 in series through resistor 71 to the junction of resistor 70 and resistor 69. The network 84, 86 and 88 forms a phase shift means to advance the phase of the applied chroma signal by 43.5°. The bottom terminal of the parallel combination of inductor 86 and resistor 88 is bypassed to ground through a large capacitor 73. The resistor 71 is in a direct current path from the junction of the cathode bias resistors 70 and 69 through winding 86 to the suppressor grid 61** of the blue signal demodulator section.

Thus, the $B-Y$ suppressor grid 61 to the cathode 55 bias is greater than the $R-Y$ suppressor grid 63 to cathode 55 bias. This causes the chroma modulation components applied to the $R-Y$ suppressor grid 63 to be amplified linearly after demodulation, while the chroma signal applied to the $B-Y$ suppressor grid 61 is amplified nonlinearly after demodulation. The increased $B-Y$ grid bias causes the negative voltage swing of the output signal becoming larger than the positive voltage swing. This effect is obtained because of the suppressor grid to plate current nonlinearity of tube 54.

In FIG. 2, the suppressor grid voltage to plate current transfer characteristic is shown. The blue chroma modulation components are applied to the suppressor grid 61 and demodulated in tube 54 to form the $B-Y$ wave shown (for a color bar representation). The demodulation of the blue chroma signal takes place at a certain phase of the subcarrier frequency produced by the oscillator portion of the demodulator. In the system of the demodulation tube 54, at the same time, amplification of the demodulated signal takes place. The amplification is determined by the suppressor grid to plate transfer characteristic which compresses the negative swings and expands the positive signal swings. The operation point of the amplification is determined by the DC potential applied to the suppressor grid 61 from the voltage divider of resistors 69, 70 and 68. The bias is such that the blue signal amplification section of the tube 54 is driven in a nonlinear range. The amplification takes place according to the transfer characteristic between grid 61 and plate 67 after the chroma signal has been demodulated. The demodulated $B-Y$ signal A in FIG. 2 cannot be actually observed in the combined oscillator-demodulator and amplifier tube 54, but wave A represents a linear form of a demodulated $B-Y$ color bar signal. Therefore, the $B-Y$ signal A applied to the transfer characteristic for amplification has the hypothetical shape shown in FIG. 2. The current $I_p$ of the $B-Y$ signal at the plate 67, represented by wave B, has a more positive swing than negative swing due to the described nonlinear operation. Since the plate voltage has a phase shift of 180° in relation to the plate current, the voltage $V_p$ at the plate 67, represented by wave C, has more negative than positive swing. Because the voltage at the plate 67 controls the blue gun of the picture tube 27, the increasing negative swing turns the blue gun more off for all colors which need no blue to be reproduced and provides better color fidelity, as it will be described later. The red chroma signal is applied to the suppressor grid 63 at a more positive bias point so that the red signal amplification section of tube 54 is driven in a linear range. Therefore, the signal $R-Y$ at the plate 65 has substantially the same negative as positive swing. Since only a nonlinear amplification of the demodulated signal is important, it is obvious that the invention may also be used in a color receiver with a separate amplifier following the demodulator circuit, by biasing the blue signal amplifier for nonlinearity to develop a more negative voltage swing than positive voltage swing.

Because of the phase delay by 44° of the $R-Y$ chroma signal and the phase advance of the $B-Y$ chroma signal, the signals of the transformer 42 are shifted in phase to differ by 87.5° between the red grid 63 and the blue grid 61 of the tube 54. With reference to the incoming signal the phase of the locally generated color reference signal in tube 54 is 270°. Due to the manner in which the chrominance information is supplied to the tube 54 and as these signals vary in phase and amplitude to represent variations in hue and saturation of the television image, the current conduction to the anodes of the tube 54 will vary to represent the $R-Y$ and $B-Y$ color difference signals at the anode, with no divider network being used in the plate circuitry of the tube 54 to obtain a desired amount of $B-Y$ information in respect to $R-Y$ information. By experiment it has been found that reduced blue signal compared to red signal gives more pleasing television pictures. The system provides this by the described biasing.

A capacitor 96 is connected between the red control grid 94 in the tri-beam cathode ray tube 27 and the $R-Y$ anode 65 of tube 54. A resistor 98 connected across the capacitor 96 provides some amount of direct current coupling in the signal path of the color difference signal. The load impedance for the $R-Y$ anode 65 is resistor 52 connected to the positive voltage. It may be seen that the network consisting of resistor 97 and capacitor 95 and coupling the $B-Y$ anode 67 of the demodulator tube 54 to the picture tube 27 corresponds in circuitry with the network connected to the $R-Y$ anode 65 of tube 54. The $B-Y$ anode is further connected through resistor 53 to a positive voltage source.

The $G-Y$ or green color difference signal is recovered from the screen grid 58 of the tube 54 in the network consisting of the coupling capacitor 91 in parallel to resistor 93, which coupling network is connected between that $G-Y$ screen grid 58 and the green control grid 92 of tube 27. Due to construction of tube 54, when plate current flows in either one of the anodes 65, 67, the current of the screen grid 58 will be reduced thus causing a rise in the voltage appearing in the screen grid. When both sections of the tube 54 are conducting simultaneously, as they do when the signal components representing the green color are present on the chroma suppressor grids 61, 63 of tube 54, the demodulator anodes will be drawing a substantial amount of their maximum plate current to cause a drop in the anode voltage to reduce the drive to the red and blue grids. Furthermore, a drop in anode voltage is accompanied by a rise in the screen grid voltage to increase the drive to the green grid of tube 27.

The red, green and blue grids of the picture tube 27 are connected through isolating resistors 103, 104 and 105 to the arm of potentiometer 106. The potentiometer 106 permits adjustment of the direct current bias on the control grids of the tube 27.

In order to develop satisfactory color difference signals in the demodulator system, a certain relationship must exist between the various signal components translated in the demodulator. To obtain more pleasing red, yellow, green and flesh tones a lower $B-Y$ output than $R-Y$ output is required. This is obtained as already described by biasing the $B-Y$ suppressor grid 61 of the tube 54 more negative than the $R-Y$ suppressor grid 63. The right bias may be obtained by the choice of the value of resistors 68, 70 and 69. The greater bias of the $B-Y$ grid causes an increased negative swing than positive swing of the voltage obtained at the anode and turns the blue gun off even more for red, yellow and green. Thus, colors which need no blue to be reproduced have a better fidelity. In order to avoid appearance of green in red, blue and magenta tones the invention also uses a higher level of negative than positive $G-Y$ output. Thus, the nonlinear output of the $B-Y$ appears in the $G-Y$ at the screen grid 58 of the tube 54 giving the $G-Y$ output the same type of nonlinearity as the $B-Y$ output at the anode 67 of the tube 54.

In practice, it has been shown that the most pleasing colors can be obtained by intentionally biasing the $B-Y$ grid to produce a 41.6% positive $B-Y$ output and a 58.4% negative $B-Y$ output.

There are several reasons why only the output for $B-Y$ and $G-Y$ are made nonlinear while the $R-Y$ output is kept linear. The $R-Y$ output is the highest in amplitude compared to $B-Y$ and $G-Y$. If the $R-Y$ output is biased to give a greater negative than positive swing, a loss in maximum P-P chrominance output would be observed. Because $R-Y$ has the largest P-P chrominance output, it naturally develops the largest negative swing without nonlinear biasing. Finally, the colors that are most important as far as color fidelity is concerned are red, blue, green and flesh tones. The observer will not notice slight variations in the pastel colors, but impure primaries and flesh tones are picked out immediately. According to the invention blue and green in red, blue in yellow, blue in green, and green in blue are taken care of by the nonlinear biasing. Red in green is taken care of by the normal large amplitude of negative red. As a specific example, the $R-Y$ signal may be 150 volts P-P and the $B-Y$ signal 50 volts positive and 70 volts negative from a reference level of non-color producing bias at grids 94 and 99.

Biasing the $B-Y$ grid so that the $B-Y$ output has a greater negative swing than a positive swing also gives the effect of a larger percentage of DC coupling than actually exists. If the transmission of a solid green field is assumed, the plate voltage of the $B-Y$ section of the tube 54 will drop from the voltage that would exist under a monochrome transmission. Therefore, if the $B-Y$ plate were only AC coupled, the voltages on the blue grid of the picture would not change. Thus, if all three grids of the picture tube were AC coupled to their respective outputs of the tube 54, the green field would not appear on the picture tube. On the other hand, if all three picture tube grids were 100% DC coupled, a green field would appear. The major drawback to 100% DC coupling is the possibility of picture tube background shift due to plate current slump in the tube 54. A compromise, therefore, has to be made between enough DC coupling to produce acceptable solid fields, but not too much DC coupling so that minor tube slumping causes severe background shifts. By biasing the $B-Y$ grid of the tube 54 so that the negative $B-Y$ output is greater than the positive $B-Y$ output, the $B-Y$ plate voltage of the tube 54 will drop lower on a green field than it would for linear operation. Thus, the blue grid of the picture tube also sees a larger drop as if a higher percentage of DC coupling existed, but does not see a larger drop due to a slumping tube 54. The same argument is true for the $G-Y$ output.

A further advantage of nonlinear biasing of the $B-Y$ grid is to give a greater latitude in the hue control range for flesh tones. Negative $B-Y$ output information normally exists when flesh tones are present. The hue control is so set up that at one end flesh tones go greenish and at the other end they go bluish. By increasing the amount of negative $B-Y$ information, the hue control has to be turned further in the bluish flesh tone direction before the flesh tones take on a bluish tint. This gives the observer more latitude in hue control to obtain pleasing flesh tones.

We claim:

1. A demodulator for a color television signal comprising subcarrier chroma modulation signal components representing color difference signals at various phase angles and a color subcarrier reference signal, including in combination, a first demodulator for a first color difference signal having first input and first output means, a second demodulator for a second color difference signal having second input and second output means, means to apply said subcarrier chroma modulation signal components to said first and second input means with said subcarrier chroma modulation signal components varying in opposite direction from a reference level, oscillator means locked to said color subcarrier reference signal for providing the control signal of the subcarrier frequency, means to apply a selected phase for said control signal to said first and second demodulators, said first and second demodulators acting to translate said subcarrier chroma modulation signals and said control signal to said first and second output means, means for biasing said first and second demodulators with different bias voltages so that for said first demodulator there is less amplitude of translated signal for a given variation of said subcarrier chroma modulation signal from said reference level in one direction than the amplitude of the translated signal for an equal variation of said subcarrier chroma modulation signal from said reference level in the other direction.

2. A demodulator according to claim 1 in which said first and second demodulators and said oscillator means comprise a two section vacuum tube having a common cathode and control grid connected in an oscillator circuit operative at the frequency of the subcarrier reference signal, resistor means series coupled to said cathode having first and second taps, means coupling said first tap to said first input means to provide a relatively large bias to said first demodulator and means coupling said second tap to said second input means to provide a relatively small bias to said second demodulator.

3. A demodulator according to claim 2 in which said two section vacuum tube includes portions having transfer characteristics comprising a linear and a non-linear portion with said first demodulator being biased for operation in the non-linear portion of said second demodulator being biased for operation in the linear portion of the transfer characteristics.

4. A demodulator according to claim 1 and further including, means for combining said first color difference signal and said second color difference signal to develop a third color difference signal, said means for combining including said first and second demodulators, said third color difference signal having a reference level and further having a non-linear variation in different directions from said third color difference signal reference level.

References Cited

UNITED STATES PATENTS

| | | | |
|---|---|---|---|
| 2,725,422 | 11/1955 | Stark et al. | 178—5.4 |
| 3,056,853 | 10/1962 | Espenlaub | 178—5.4 |

RALPH D. BLAKESLEE, *Primary Examiner.*
RICHARD MURRAY, *Assistant Examiner.*